March 3, 1942.  G. M. HAYNES  2,275,076
FISHING FLOAT
Filed Aug. 21, 1939
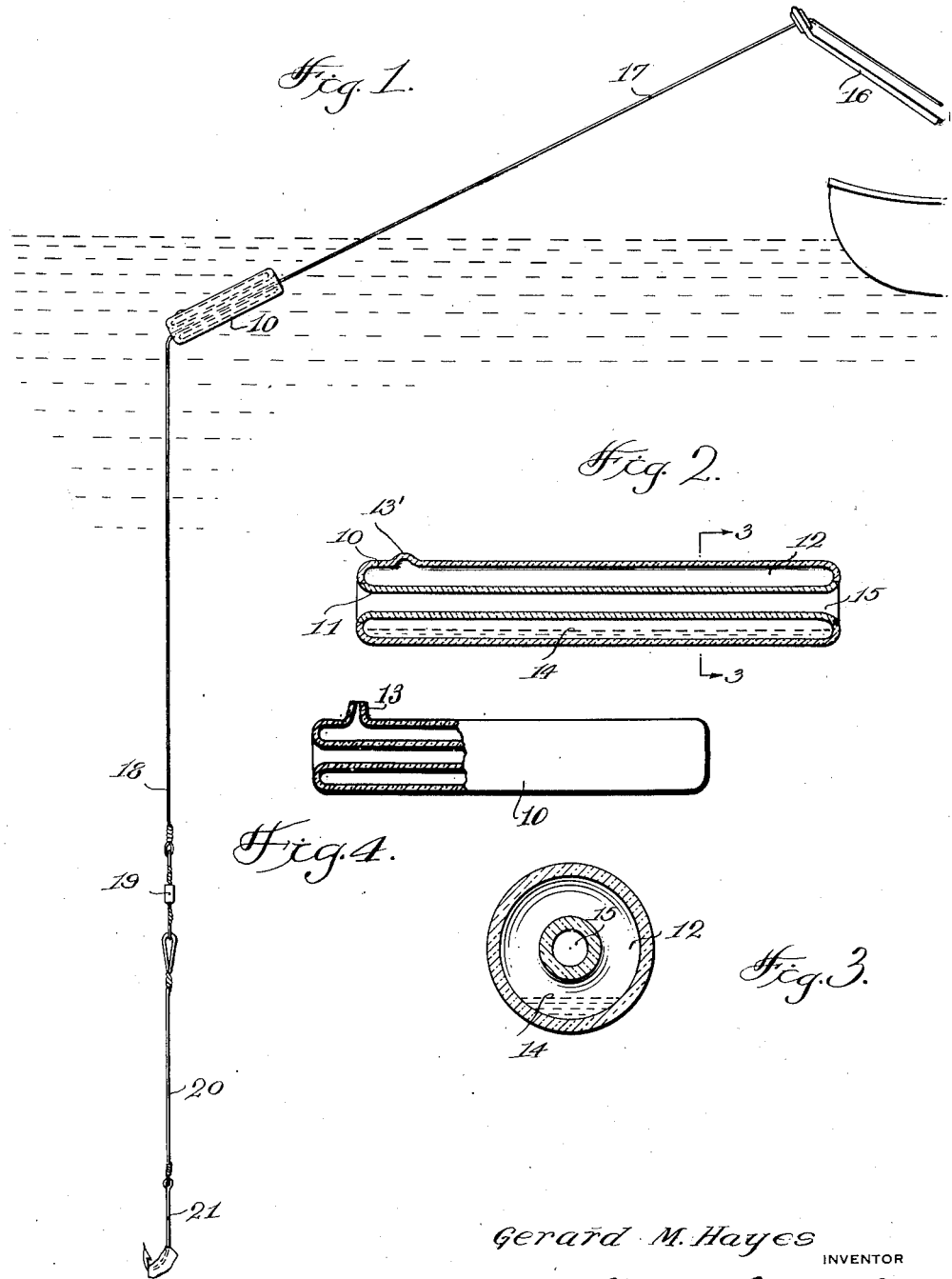
Gerard M. Hayes
INVENTOR
BY Victor J. Evans & Co.
ATTORNEYS Patented Mar. 3, 1942

2,275,076

UNITED STATES PATENT OFFICE 2,275,076

FISHING FLOAT

Gerard Michael Haynes, Eagle Rock, Calif.

Application August 21, 1939, Serial No. 291,254

1 Claim. (Cl. 43—49)

My invention relates to new and useful improvements in fishing floats.

An important object of my invention is to provide a fishing float that is adapted to slidably receive a fishing line and that will normally lie slightly below the surface of the water.

Another object of my invention is to provide a fishing float that is substantially transparent, thus materially reducing the possibility of a fish becoming frightened as a result of the opaque float bobbing at the surface of the water.

Still another object of my invention is to provide a fishing float that will permit a fish to run with the bait, and that will enable the fisherman to ascertain the critical time to set the hook.

Yet another object of my invention is to provide a fishing float that is light in weight, efficient and efficacious in the performance of its duties and inexpensive to manufacture.

Other objects and advantages of my invention will be apparent during the course of the following description.

In the drawing, forming a part of this specification, and in which like numerals are employed to designate like parts throughout the same, Figure 1 is a side elevation of my device and showing the same associated with a fishing apparatus, Figure 2 is a longitudinal sectional view of the same, Figure 3 is a transverse sectional view taken on the line 3—3 of Figure 2, and Figure 4 is a side elevation of the device as it appears before the liquid is introduced therein, parts thereof being shown in section for clearness of illustration.

In the accompanying drawing, wherein for the purpose of illustration, is shown a preferred embodiment of my invention, the numeral 10 designates an elongated transparent tubular member preferably constructed of Pyrex glass, or a like material, that is substantially transparent and that is of sufficient strength and durability to withstand the conditions to which it will be subjected. A tubular member 11, of the same material and of lesser diameter than the member 10, is coaxially disposed within the member 10 and is coextensive therewith.

The extremities of the tubular members 10 and 11 are bent toward each other and annealed by any suitable process to define a dead air space 12 therebetween and an axial bore 15 therethrough. The periphery of the outer member 10 is formed with a nozzle portion 13 through which a suitable transparent liquid 14, such as water or the like, may be introduced into the intermediate dead air space 12. After a suitable quantity of the liquid has been introduced into the space 12 the nozzle portion 13 may be heated to close the opening defined thereby, as shown at 13' in Figure 2, and to provide an air and water tight chamber between the companion tubular members 10 and 11.

The numeral 16 designates the end of a fishing pole having the line 17 extending therefrom and passing through the axial bore 15 of the float. The free end 18 of the fishing line is provided with the conventional sinker 19, leader 20, and hook 21.

The specific gravity of the float is equal to or slightly greater than that of the water and when thrown into the water, it will be normally positioned a slight distance below the surface of the water, as illustrated in Figure 1. The downward pull of the baited hook 21 and sinker 19 will position the float in slight angular relation with respect to the horizontal to cause the liquid 14 within the air space 12 to flow to the lower end thereof and to hold the same in the desired position.

When the float is in the water it will be substantially transparent to a fish, thereby materially reducing the possibility of its becoming frightened as a result of the float bobbing on the surface of the water above the baited hook. It may be seen that the float has a free sliding movement on the line 17 and is limited in its movement only by the swivel 19 and by the end 16 of the pole. As long as the line 17 is maintained in a taut condition by the fisherman, the baited hook 21 will hang downwardly from the float preparatory to a fish striking at the bait and running with the line, and the fisherman will be able to feel every move made by the hook at the end of his line, thus permitting him to accurately ascertain the moment that the fish strikes the bait or swallows the hook.

The conventional float is normally secured to the line and bobs on the water above the hook. This construction permits a slack to form in the line between the float and the end of the pole and the fisherman is deprived of his means of feeling the movements of the hook. The only manner in which he can ascertain whether or not a fish has taken the bait is by watching the float and seeing if it bobs under the water. The usual method with this type of float is to watch for the float to go under the water and then immediately try to hook the fish. This often fails because the fish does not swallow the bait, but generally strikes at it and runs. When he strikes the usual float or sinker compels the fish to drag these objects along with him as he runs. He feels this resistance, grows suspicious and drops the bait, thus causing a loss to the fisherman of a live bait and a fish.

In the applicant's arrangement the fisherman has complete control over the line at all times and when he gets a strike he lets the fish run with the bait until the fish has swallowed it and then, and not until then, does he set the hook.

It is to be understood that the form of my invention herewith shown and described, is to be taken as a preferred example of the same, and that various changes in the size, shape and arrangement of parts may be resorted to without departing from the spirit of my invention, or the scope of the appended claim.

Having thus described my invention, I claim:

A fishing float comprising continuous inner and outer transparent shells spaced apart to provide a fluid tight chamber therebetween, which chamber contains a quantity of colorless liquid for moistening the inner walls of the chamber, the shells and the contained liquid providing a float having a specific gravity slightly greater than water whereby the float will normally assume a position slightly below the surface of the water and be rendered substantially invisible thereby.

GERARD M. HAYNES.